US011732926B2

(12) United States Patent
Newsome

(10) Patent No.: US 11,732,926 B2
(45) Date of Patent: Aug. 22, 2023

(54) SOLARHEARTH PASSIVE SOLAR HEATING SYSTEM

(71) Applicant: Allison L. Newsome, Warren, RI (US)

(72) Inventor: Allison L. Newsome, Warren, RI (US)

(*) Notice: Subject to any disclaimer, the term of this patent is extended or adjusted under 35 U.S.C. 154(b) by 190 days.

(21) Appl. No.: 17/369,668

(22) Filed: Jul. 7, 2021

(65) Prior Publication Data
US 2022/0011015 A1 Jan. 13, 2022

Related U.S. Application Data

(60) Provisional application No. 63/049,283, filed on Jul. 8, 2020.

(51) Int. Cl.
*F24H 7/00* (2022.01)
*F24H 7/04* (2006.01)
*F24S 60/10* (2018.01)
*F24S 80/65* (2018.01)
*F24S 70/60* (2018.01)
*F24S 70/25* (2018.01)

(52) U.S. Cl.
CPC ............... *F24H 7/04* (2013.01); *F24S 60/10* (2018.05); *F24S 70/25* (2018.05); *F24S 70/60* (2018.05); *F24S 80/65* (2018.05)

(58) Field of Classification Search
CPC ... F24H 7/04; F24S 80/65; F24S 70/25; F24S 60/10; F24S 70/60
See application file for complete search history.

(56) References Cited

FOREIGN PATENT DOCUMENTS

KR 102227997 B1 * 3/2021 ............... F24D 3/08

OTHER PUBLICATIONS

KR102227997B1 (Translation) (Year: 2021).*

* cited by examiner

*Primary Examiner* — Shafiq Mian
(74) *Attorney, Agent, or Firm* — Adler Pollock & Sheehan P.C.

(57) ABSTRACT

The invention provides a SolarHearth, a passive solar heating system that includes a work of art that can be mounted on a building, to bring warmed air into the building. The system includes a heat exchange chamber having a display window that contains the work of art, and is is configured to create a passive solar environment to create a natural vacuum. The system further includes means for moving air through the heat exchange chamber, such as an air plenum or fans.

20 Claims, 13 Drawing Sheets

Rear Elevation

SOLARHEARTH PASSIVE SOLAR HEATING SYSTEM

CROSS REFERENCE TO RELATED APPLICATION

This application claims benefit from U.S. Provisional Patent Application Ser. No. 63/049,283 filed Jul. 8, 2021 which is incorporated by reference in its entirety.

FIELD OF THE INVENTION

This invention generally relates to systems for collecting solar energy, and more particularly, to passive solar heating systems.

BACKGROUND OF THE INVENTION

In passive solar building design, windows, walls, and floors are made to collect, store, reflect, and distribute solar energy in the form of heat in the winter and disperse solar heat in the summer. This invention is a passive solar design because, unlike active solar heating systems, it does not involve the use of mechanical and electrical devices. Doerr, Passive Solar Simplified, 1st ed. (CreateSpace Independent Publishing Platform 2012). The scientific basis for passive solar building design has developed from a combination of climatology, thermodynamics, fluid mechanics/natural convection, and human thermal comfort. The advantages of passive solar building design are well-recognized by those of skill in the building construction art. See, Bill McKibben, founder of 350.org, "Why wouldn't you want a passive solar house?" (review of Doerr, Passive Solar Simplified). See also, Janine Benyus, co-founder, The Biomimicry Institute, Biomimicry.org, "When we look at what is truly sustainable, the only real model that has worked over long periods of time is the natural world." See further, U.S. Department of Energy (DOE) Oak Ridge National Laboratory (ORNL) Buildings Technology, "Three Decades Of Passive Solar Heating and Cooling Lessons Learned." Thermal Performance of the Exterior Envelopes of Whole Buildings Tenth International Conference (2007).

To further advance the concept of passive solar building design, there should be an incorporation of both logic and beauty in passive solar architecture. Wright & Andrejko, Passive solar architecture: logic and beauty (Van Nostrand Reinhold Company, 1982). A beautiful passive solar building design that is small enough passively heat and cool a relatively smaller living space will encourage consumers of limited means to adopt passive solar heating. Accordingly, there is a continuing need in the building construction art for a beautiful passive solar heating system.

SUMMARY OF THE INVENTION

The invention provides a SolarHearth, a passive solar heating system ("the SolarHearth system") that has both ornamental and useful features.

According to one embodiment of the invention, a passive solar heating system comprises a heat exchange chamber having a display window and including an insulated framework, a work of art contained inside the insulated framework, and elements for the collection of solar heat. The system also includes an air plenum operably connected to the heat exchange chamber, the air plenum including at least one intake vent, an exhaust vent, and at least one duct connecting the at least one intake vent to the heat exchange chamber, the at least one duct configured to conduct air flow from the at least one intake vent to the heat exchange chamber.

According to another embodiment of the invention, a passive solar heating system comprises a heat exchange chamber having a display window and including an insulated framework, a work of art contained inside the insulated framework and being configured to create a passive solar environment that creates a natural vacuum; and means for moving air through the heat exchange chamber.

According to yet another embodiment of the invention, a passive solar heating system comprises a heat exchange chamber having a display window and including: an insulated framework and an aluminum sculpture contained inside the insulated framework; and an air plenum operably connected to the heat exchange chamber. The air plenum includes at least one intake vent, an exhaust vent, and at least one duct connecting the at least one intake vent to the heat exchange chamber, the at least one duct configured to conduct air flow from the at least one intake vent to the heat exchange chamber.

These and other features, aspects, and advantages of the present invention will become better understood with reference to the following description, appended claims, and accompanying drawings.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. Further, the features of the drawings are not shown to scale.

FIG. 4 is a rear view of air plenum, showing the flow of air from the intake vent, up and into the heat exchange chamber, and then up and out the exhaust vent. The grey color shows the air plenum.

FIG. 5 is a rear view of air plenum, showing the flow of air from the intake vent, up and into the heat exchange chamber, and then up and out the exhaust vent. The grey color shows the air plenum.

INDUSTRIAL APPLICABILITY

Figure 1:
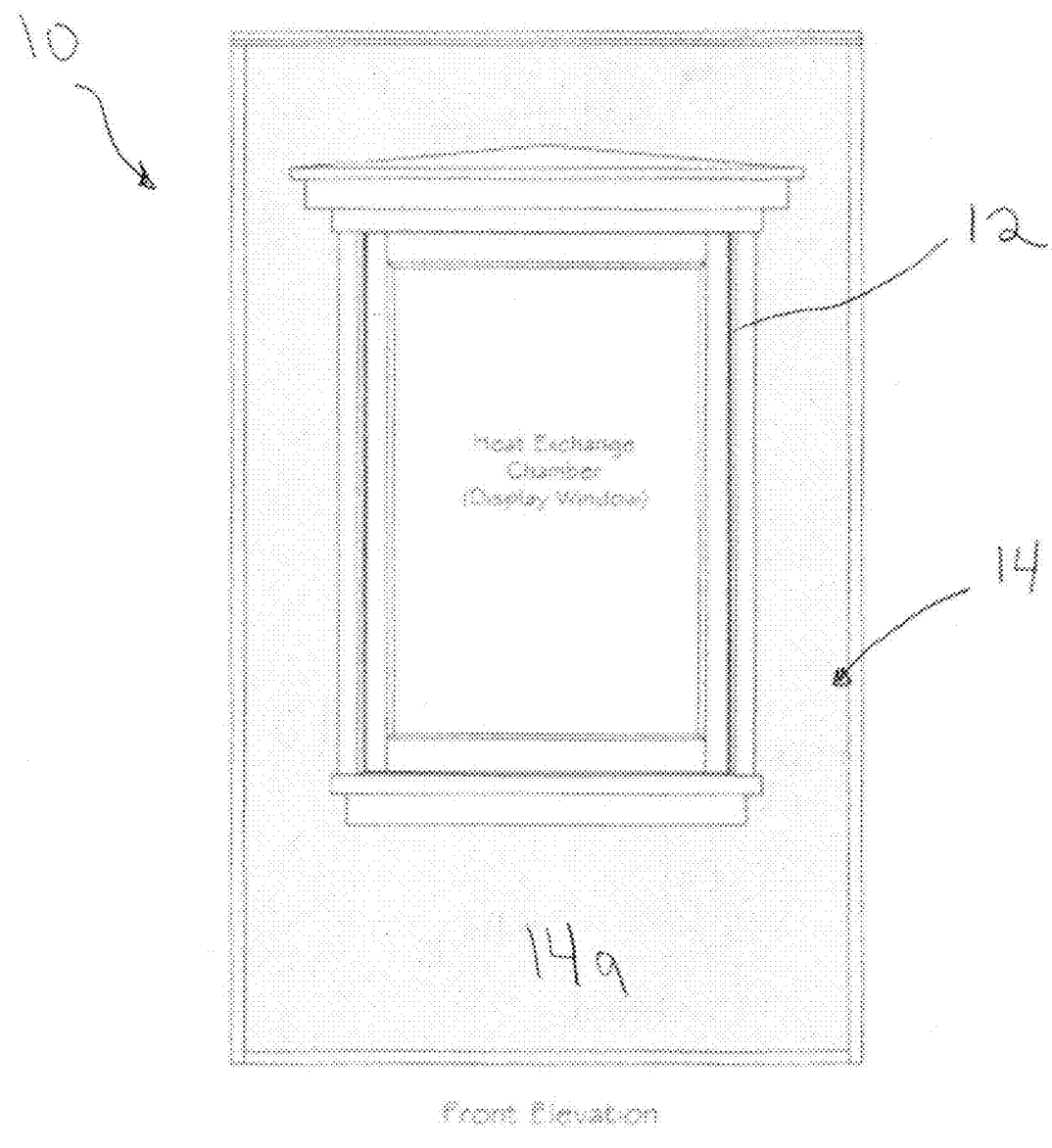
FIG. 1 is a conceptual illustration showing the front view of the SolarHearth system of the present invention, including the heat exchange chamber (display window). The grey color shows the air plenum.

The inventor has calculated that one SolarHearth passive solar heating system unit of approximately 8'×6'×24" in size provides an estimated financial savings during the cold winter months (e.g., those experienced in Rhode Island, USA) of ~$50 per month (~USD50/month in 2018 USD, or the equivalent in other currencies). During the summer months (e.g., those experienced in Rhode Island, USA), the SolarHearth passive solar heating system draws heat off of the building and upwards, creating an upward thermal cooling convection.

The SolarHearth system, in addition to being beautiful, is useful for those of skill in the building construction art who want to construct or rehabilitate buildings to meet energy efficiency standards. The Passivhaus standard is a rigorous, voluntary standard for energy efficiency that reduces a building's environmental footprint and results in ultra-low energy buildings that require little energy for space heating or cooling. See, "Definition of Passive House." PassivHaus-tagung.de. See also, Gröndahl & Gates, "The Secrets of a Passive House." The New York Times, (Sep. 25, 2010); and Zeller, Jr., "Beyond Fossil Fuels: Can We Build in a Brighter Shade of Green?". The New York Times, p. BU1 (Sep. 26, 2010). A similar standard, MINERGIE-P, is used in Switzerland. See, "Minergie-Standard." Minergie.ch. Passivhaus standards also exist in the United States. See, "PHIUS+ 2015: Passive Building Standard—North America".www.phius.org.

BEST MODE FOR CARRYING OUT THE INVENTION

Definitions

"About" has the lay definition meaning approximately the value as stated, encompassing measurement errors that would be made by a lay person.

"Duct" is a tube, channel, or canal through which a gas (such as cold or heated air) or liquid moves.

"Heat transfer relationship" means that the heat storage element is placed in sufficient thermal contact to an element with which it is in such a relationship to transfer heat to that element. The heat may be transferred to the element by any suitable means, such as by convection, conduction or forced heat transfer, e.g., fans moving heated air throughout the building.

"Plenum" or "air plenum" has the definition known to those in the building construction arts, being a separate space providing pathways for airflows for heating, ventilation, and air-conditioning (collectively "HVAC"). See, Thomas, "What is plenum?" TechTarget (Sep. 21, 2005).

Detailed Description of the Preferred Embodiments

The SolarHearth system includes a sculpture whose form follows the function and principals of thermosyphon in that it uses a method of passive heat exchange based on natural convection found in the science of passive solar heating and thermal chimneys. Various embodiments of the SolarHearth system are described below.

In a first embodiment, the SolarHearth system includes a work of art (e.g., a sculpture) that can be mounted, e.g., on the south side exterior wall of a building, to bring warmed air into the building. The SolarHearth system comprises (a) an air plenum, with ducts for the flow of air from an intake vent, up and into a heat exchange chamber, and then up and out an exhaust vent, and (b) a heat exchange chamber. The heat exchange chamber includes a display window, and the display window includes a work of art (e.g., a sculpture) contained inside an insulated framework (e.g., of wood glazed with Plexiglass).

Figure 2:
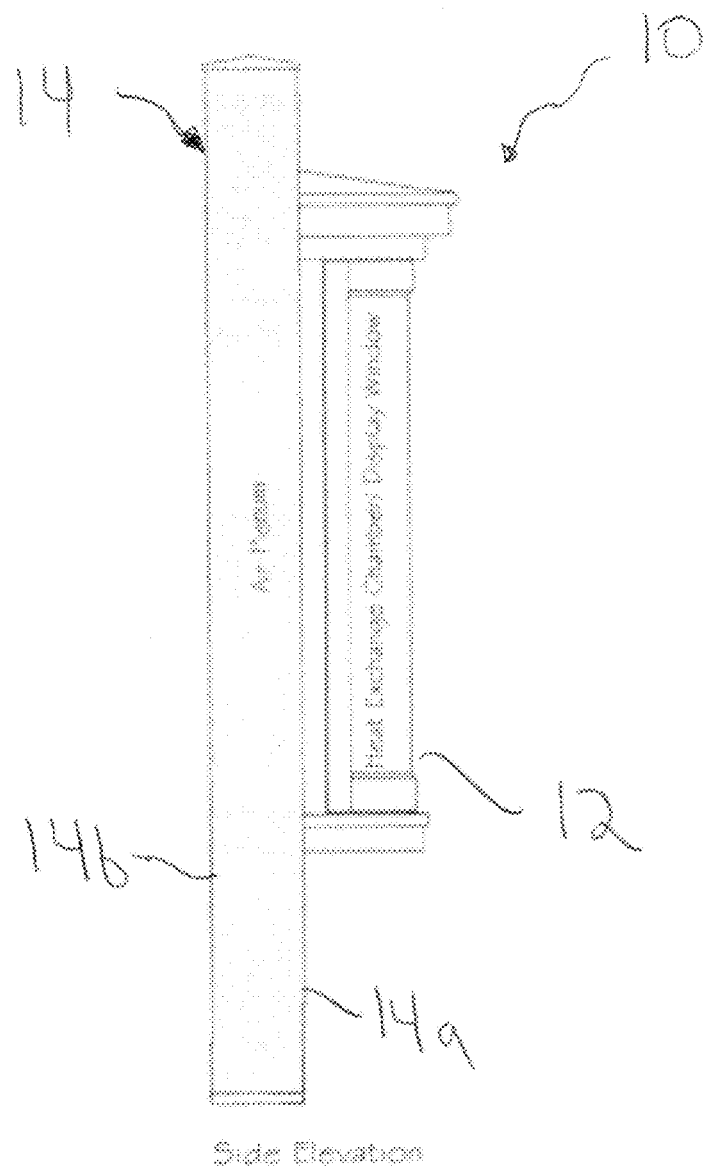
FIG. 2 is a conceptual illustration showing the side view of the SolarHearth system of the present invention, including the heat exchange chamber (display window). The grey color shows the air plenum.

Referring now to FIGS. 1 and 2, an exemplary embodiment of the SolarHearth system 10 includes a heat exchange chamber and display window 12 having a passive solar work of art (e.g., a sculpture) that is installed within the inside and outside of an exterior wall of a building. In various embodiments, the sculpture is made of one or more aluminum materials. In one embodiment, the aluminum sculpture is made of aluminum repoussé sheet metal, aluminum screen and aluminum hollow tubing installed behind a transparent glazed surface. Thin-gauged aluminum is used because it transfers heat, rather than holding it, allowing the air to be quickly heated by the metal and moved through the heat chamber. For the sake of clarity, the passive solar sculpture is not shown in FIG. 1 or 2, but is shown in other figures, as discussed below.

The aluminum sculpture is designed to create a passive solar environment that creates a natural vacuum that allows cool air to be sucked into the lower section of the solar heater where it immediately starts to warm. The hot air rises and such air continues to be heated until the top is reached, where it travels back into the building's interior space (i.e., one or more rooms). This natural cycle allows the air to circulate and transfers the solar heated air into the building's interior space.

Figure 3:
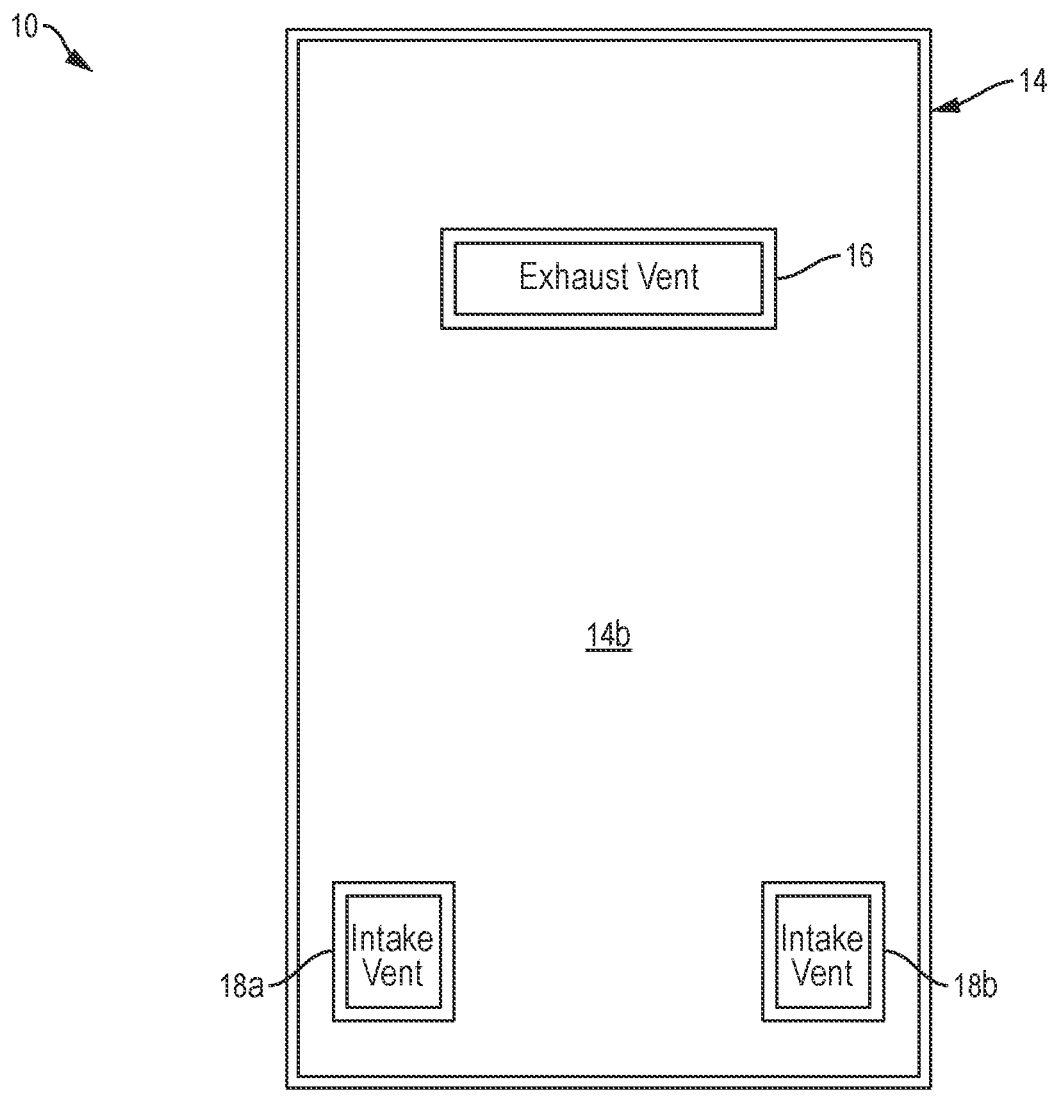
FIG. 3 is a conceptual illustration showing the rear view of the SolarHearth system of the present invention, including the exhaust vent and two intake vents. The grey color shows the air plenum.

The SolarHearth system 10 further includes an air plenum 14 that can be incorporated into the exterior wall of the building (see FIGS. 1, 2, 10 and 11). The plenum 14 includes a front surface 14a and an opposite, rear surface 14b, ducts 15, an exhaust vent 16, side intake vents 18a, 18b in communication with the ducts 15, and a central intake vent 20 that is also in communication with the ducts 15 and is configured to direct air into the heat exchange chamber and display window 12 and out of the exhaust vent 16 (see FIGS. 3-5).

Figure 4:
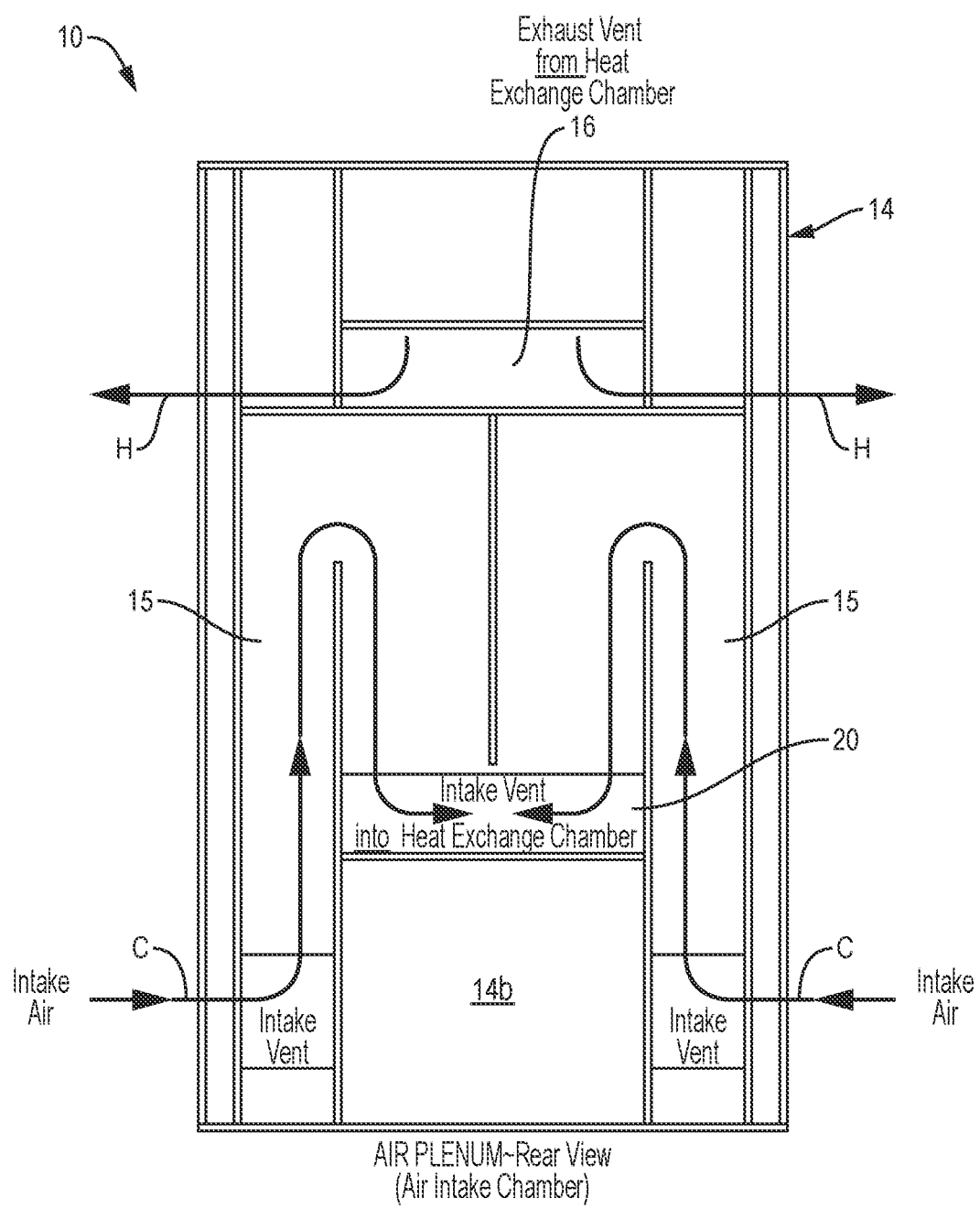
FIG. 4 is a conceptual illustration showing the air flow in the SolarHearth system of the present invention.
Figure 5:
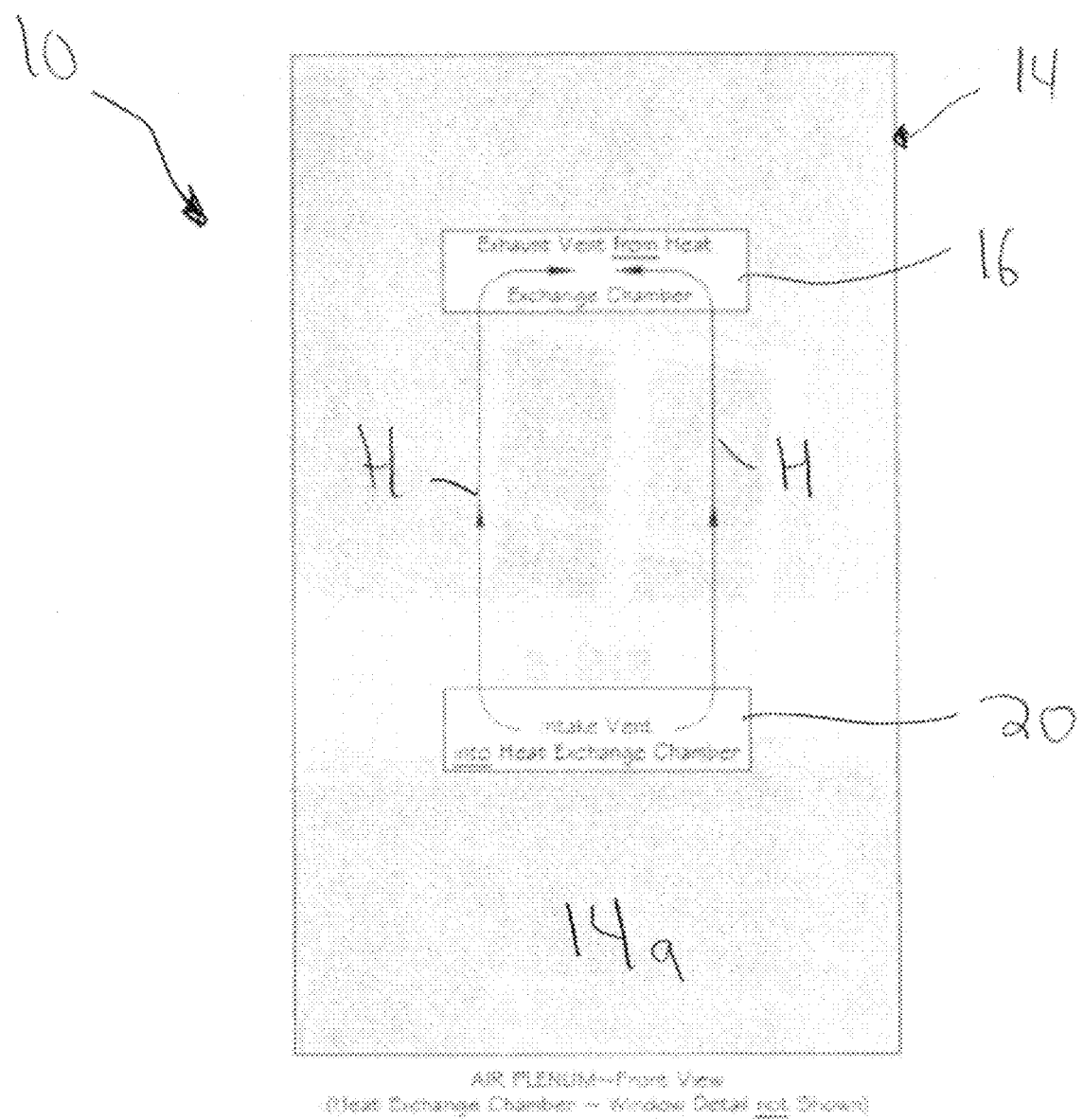
FIG. 5 is a conceptual illustration showing the air flow in the SolarHearth system of the present invention.

Referring now to FIGS. 4 and 5, the SolarHearth system 10 constitutes a "double trap", wherein the plenum 14 allows cool air to enter from an interior room/space (i.e., of a house or other building space) via its side intake vents 18a, 18b, where it passes upwards through the ducts 15 and the central intake vent 20 and into the heat exchange chamber and display window 12 and its exterior aluminum sculpture (represented by arrows C). Hot air then travels back through the heat exchange chamber and display window 12 and sculpture (represented by arrows H), through the exhaust vent 1$ at the top of the plenum 14, and re-enters the interior room as added heat. The plenum 14 is located directly behind the solar sculpture/heat exchange chamber and display window 12 and is, therefore, the back/rear component of the SolarHearth system 10.

The SolarHearth system 10 generates heat when the sun is striking the exterior glazed aluminum of the aluminum sculpture. When the sun goes down, and the outside temperature starts to drop, the plenum 12 that is incorporated into the exterior building wall stops the flow of cold air into the room, In the summer, when the temperature outside is hot, the plenum 12 will not allow hot air to enter.

At cooler temperatures (i.e., during the night), cool air accumulates in the trap formed by the plenum 14, and warm air in the plenum 14 rises to the top of the trap formed by the plenum 14, thereby preventing a reverse flow.

Figure 6:
FIG. 6 is a photograph showing a heat exchange chamber (display window) situated above the windows of a brick building.
Figure 7:
FIG. 7 is a photograph showing a heat exchange chamber (display window) situated between the windows of a brick building.

The SolarHearth system 10 can vary in size. In various embodiments, the SolarHearth system 10 can have sizes ranging from 2'×2' to the size of any existing building's wall. The SolarHearth system 10 is advantageously incorporated into a wall of a building that faces south or southwest (see FIGS. 6 and 7). FIG. 6 shows the heat exchange chamber (display window) 12 situated above the windows W of a brick building. FIG. 7 shows the heat exchange chamber (display window) 12 situated between the windows W of a brick building.

The air can enter the SolarHearth system 10 may be as cold as 5° F. and increase to as much as 150° F. after having passed through the glazed aluminum sculpture and re-entering a room through the plenum.

In a second embodiment, the invention provides a method of making a passive solar heating system (i.e., the Solar-Hearth system) whereby those of skill in the building construction art can remove the work of art from the insulated box and replace with a new work of art (e.g., sculpture design).

In a third embodiment, the invention provides a method of making a passive solar heating system whereby those of skill in the building construction arts construct the passive solar heating system (i.e., the SolarHearth system) from materials selected from the group consisting of aluminum sheet, aluminum screen, rivets, wire, eye hooks, wood, plexiglass, insulation (including thermal cork insulation (i.e., black insulation), which is formaldehyde-free charcoal-burnt brown cork) and high-heat metal dye colors. In one exemplary embodiment, the aluminum sheet has a thickness of about 0.02 mm.

Alcohol Metal Dyes are commercially available, e.g., from STEELF/X (Utah, USA). Thermal cork insulation (i.e., black insulation) is commercially available, e.g., from K-Flex (Youngsville, N.C., USA) and formaldehyde-fee/non-toxic.

In a fourth embodiment, the passive solar heating system comprises one or more fans. As a non-limiting example, a quiet, low turbulence fan is commercially from AC Infinity CLOUDLINE T6, Quiet 6" Inline Duct Fan with Temperature Humidity Controller-Ventilation Exhaust Fan for Heating Cooling Booster.

Other commercially available materials that those of skill in the building construction arts can advantageously use to construct the passive solar heating system. In one embodiment, the invention provides a method of making a passive solar heating system whereby those of skill in the building construction arts construct the passive solar heating system from materials selected from the group consisting of black powder-coated aluminum frame, 3"×10" powdered aluminum, and curving polycarbon.

The inventor has discovered that not all of the aluminum sculptural artwork needs to be painted black for optimum heat absorption and transfer of heat gain. Accordingly, in a fifth embodiment, the invention provides a method of making a passive solar heating system (i.e., the SolarHearth system) whereby those of skill in the construction arts can use metal dyes in deep purple, greens, and blues to obtain maximum beauty in the aluminum artwork. In this method, metal dyes are applied, brushed onto repousse aluminum interior imagery. The translucent quality of the metal dyes also allows for the beauty of the silver color of the repousse aluminum metal to be seen, and the artworks surface detail highlighted.

The inventor has also discovered that the use of thermal cork insulation for heat absorption, instead of painting the surface black for heat absorption, advantageously eliminates the generation of odor or fumes when the air in the Solar-Hearth system is heated during the operation thereof. Accordingly, in a sixth embodiment, the invention provides a method of making a passive solar heating system (i.e., the SolarHearth system), whereby those of skill in the building construction art use thermal cork insulation when constructing such a system. Formaldehyde-free charcoal burnt cork is used for insulation, as it is sustainable, renewable and non-toxic. The charcoal burnt cork insulation is fastened using aluminum spikes, thereby eliminating the use of glue or any other adhesives.

The inventor has further discovered that glues, adhesives, solders, or other similar materials obstruct the transfer of heat gain released from the aluminum imagery in addition to being broken down by the sunlight. Accordingly, in a seventh embodiment, the work of art in the heat exchange chamber is completely aluminum and fastened together by a riveting method. All of the aluminum sculptural imagery is fastened together by aluminum rivets. By using aluminum rivets, surface area for solar capture is added, keeping the flow of warmed/heated air uninterrupted.

In an eighth embodiment, the invention provides a method of making whereby those of skill in the building construction arts can build the passive solar heating system (i.e., the SolarHearth system) in different formats to complement the building to which the system is attached (e.g., square, rectangular, triangle, or oval).

The steps of the method depend on the shapes of the format, oval, square, rectangle, etc. There must be an intake at the bottom drawing air from inside an interior up through the heat chamber and an intake at the top, drawing heated air back into an interior room. In the format were horizontal rather than vertical it would require several intakes at the bottom and top to draw air through it across a horizontal design.

Figure 8:
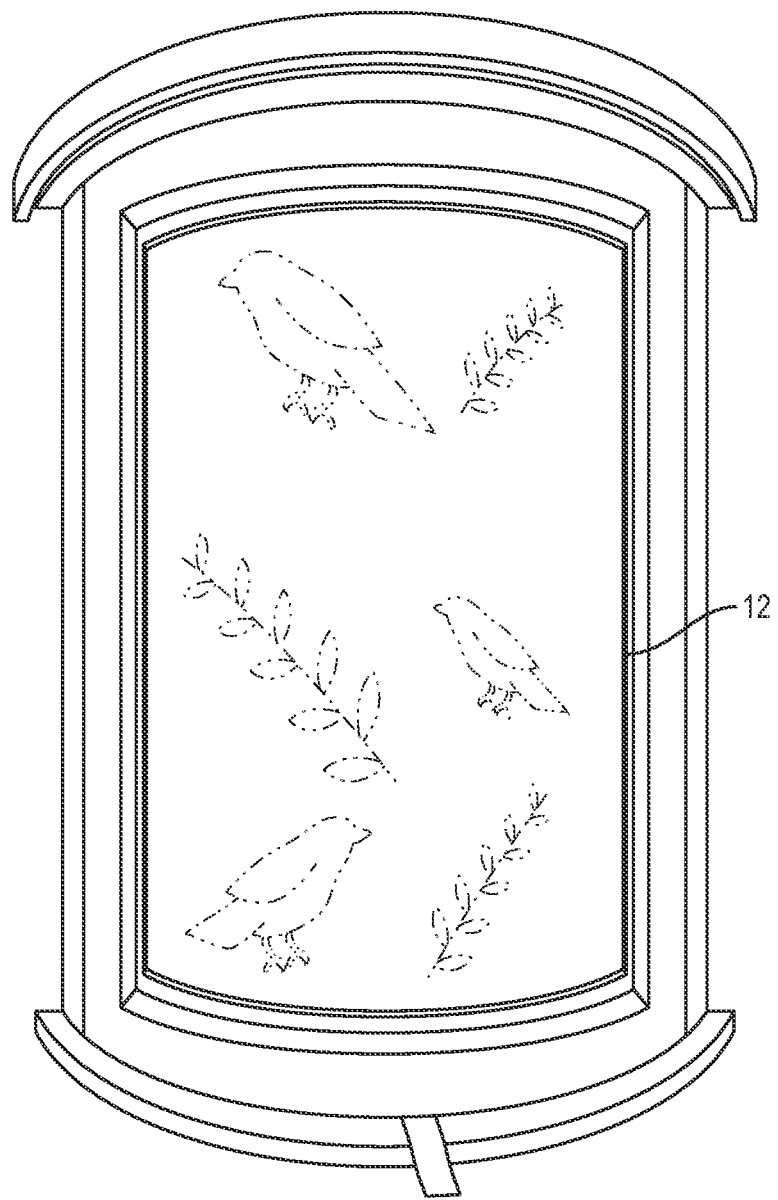
FIG. 8 is a photograph showing a heat exchange chamber (display window) with fern fern-shaped fractal design.
Figure 9:
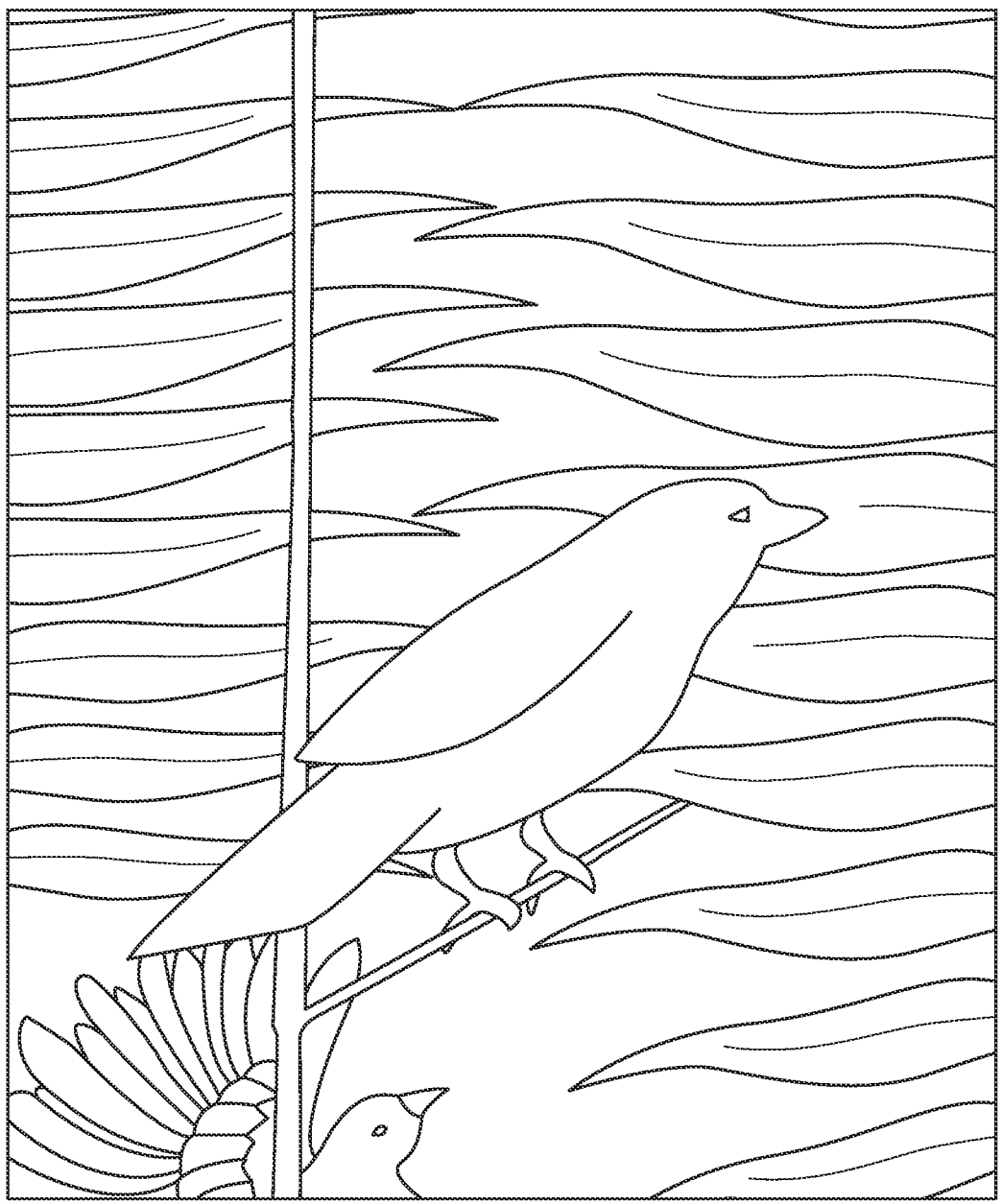
FIG. 9 is a photograph showing a section of a heat exchange chamber (display window) with the fern-shaped fractal design.
Figure 10:
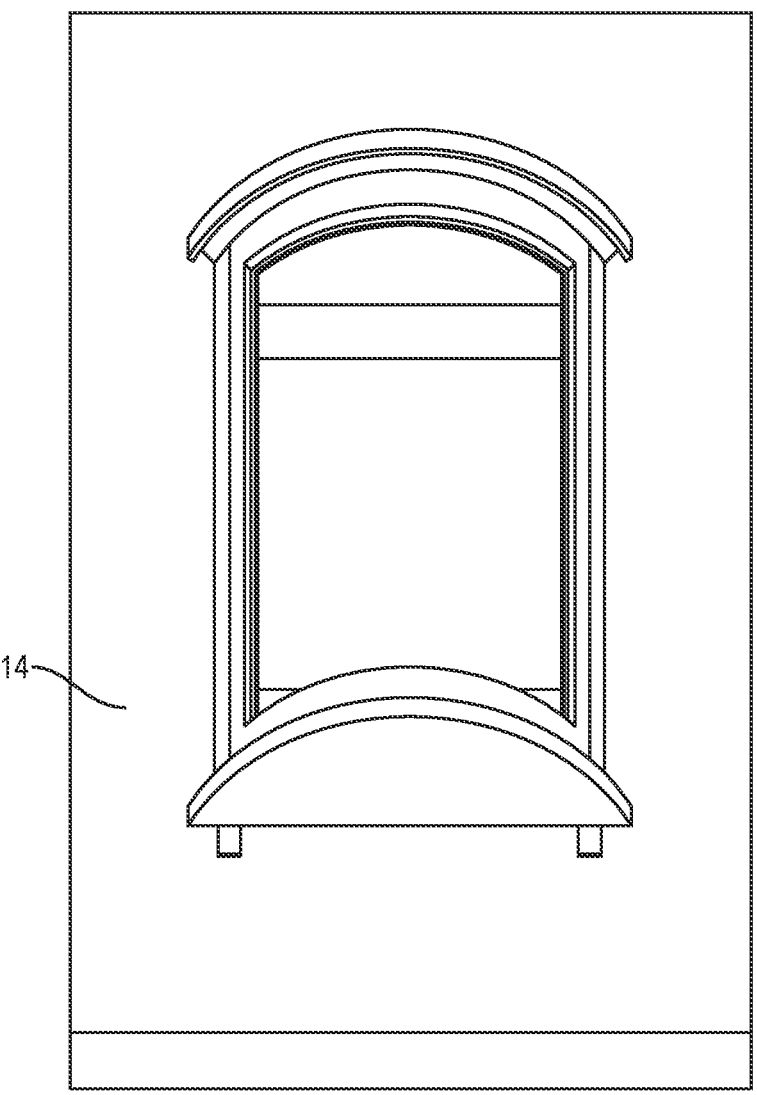
FIG. 10 is a photograph showing the construction of a wooden component of an air plenum, aluminum construction material in the background.
Figure 11:
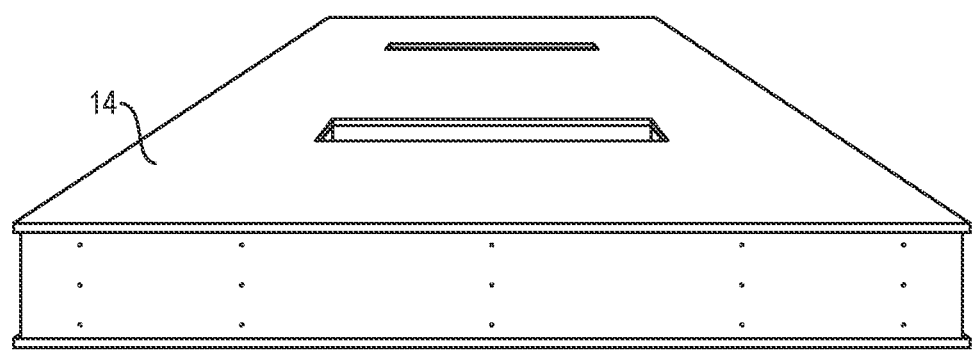
FIG. 11 is a photograph showing the construction of a wooden component of an air plenum, with the inventor in the background to show the scale of the air plenum.
Figure 12:
FIG. 12 is a schematic illustration showing the SolarHearth system of the present invention installed in a house.
Figure 13:
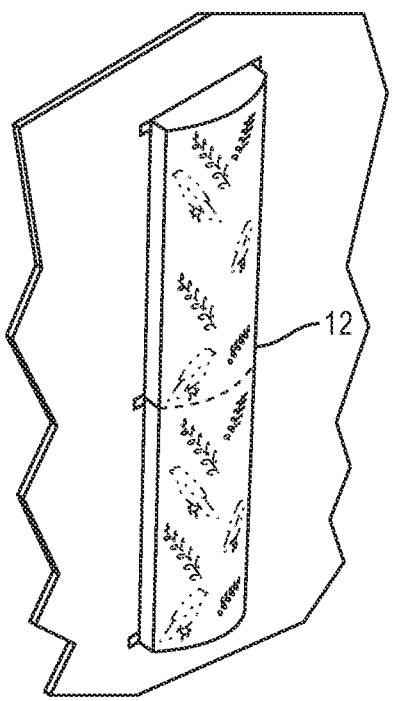
FIG. 13 is a top perspective view of an alternate version of the heat exchange chamber shown in FIG. 8.
Figure 14:
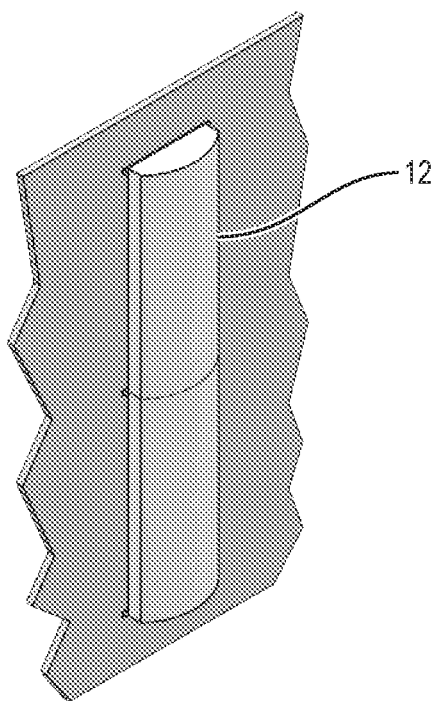
FIG. 14 is a top perspective view of another alternate version of the heat exchange chamber shown in FIG. 8.
Figure 15:
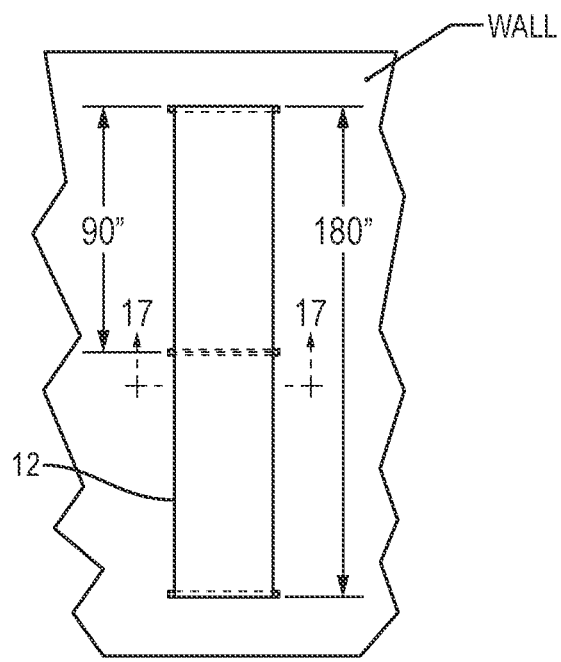
FIG. 15 is an industrial sketch showing the front view of the heat exchange chamber shown in FIG. 1 and FIG. 8.
Figure 16:
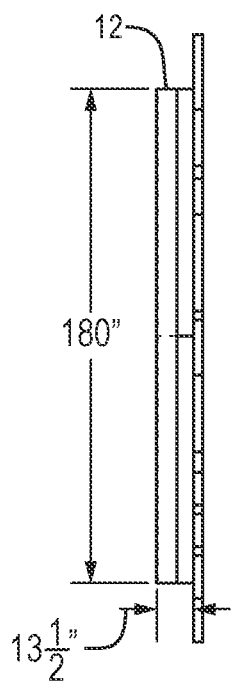
FIG. 16 is an industrial sketch showing the side view of the heat exchange chamber shown in FIG. 2.
Figure 17:
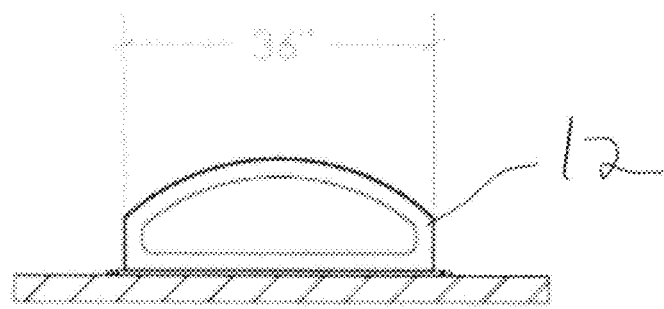
FIG. 17 is an industrial sketch showing a top view of the heat exchange chamber shown in FIG. 1 and FIG. 8.
Figure 18:
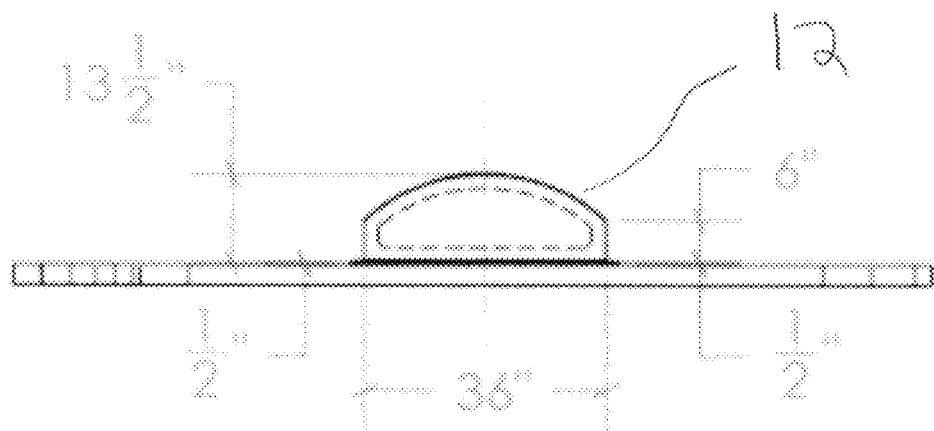
FIG. 18 is an industrial sketch showing an alternative top view of the heat exchange chamber shown in FIG. 1 and FIG. 8.

In a ninth embodiment, aluminum is formed (through the use of biomimicry) in fern-shaped designs and used as a framework. Those of skill in the building construction arts can form the aluminum according to such designs. Ferns have an ancient fractal design for solar capture. See, Thekkekara & Gu, "Bioinspired fractal electrodes for solar energy storages." Sci. Rep. 7, 45585; doi: 10.1038/srep45585 (2017). Upon this framework, other artistic imagery is added to the overall design. See FIG. 8, FIG. 9 and FIG. 13.

In a tenth embodiment, an aluminum screen is hung for solar capture in between the layers of the repousse sheet metal artwork. The overall design and use of aluminum rivets for all attachments assure solar capture and thermal heat gain as the colder air moves from bottom to the top of the sculpture.

Data. The inventor has taken readings on sunny days, about once a week, to record the temperature outside in the environment and the temperature inside the SolarHearth system. On one day in February 2019 in Rhode Island, USA, for example, the temperature outside in the early afternoon was 28° F., while inside the SolarHearth system the temperature was 127° F.

OTHER EMBODIMENTS

FIGS. 12-18 show alternate embodiments of the SolarHearth system that includes a heat exchange chamber and display window 12 having a passive solar sculpture that inhabits the inside and outside of an exterior wall of a building, but do not include a plenum. In such alternate embodiments, air coming into the system is moved by one or more fans and pipe vents. The SolarHearth system draws cooler air from an interior space through a bottom vent. Air is drawn vertically, heated in the passive solar heat chamber, and drawn back inside, whereupon an adjoining room/space is heated by the passive solar energy.

In various embodiments, the thermal cork insulation insulates for optimum heat, the aluminum repousse imagery absorbs trapped heat and transfers, and the Plexiglass (i.e., of the insulated framework) traps the heat. The metal dyes darken the aluminum imagery for increased heat absorption and heat transfer from the metal back into the air that is then drawn through the heated-up metal plenum/back into the room. One or more fans may alternatively be used to draw the air.

The contents of all references cited herein are incorporated by reference in their entireties. In case of conflict, this application, including any definitions herein, will control.

Having thus described in detail preferred embodiments of the present invention, other embodiments will be evident to those of ordinary skill in the art. The foregoing detailed description is illustrative and not restrictive. The spirit and scope of the present invention are not limited to the above examples but are encompassed by the following claims.

I claim:

1. A passive solar heating system, comprising:
   a heat exchange chamber having a display window and including:
      an insulated framework,
      a work of art contained inside the insulated framework, and
      elements for the collection of solar heat; and
   an air plenum operably connected to the heat exchange chamber, the air plenum including:
      at least one intake vent,
      an exhaust vent, and
      at least one duct connecting the at least one intake vent to the heat exchange chamber, the at least one duct configured to conduct air flow from the at least one intake vent to the heat exchange chamber.

2. The passive solar heating system of claim 1, wherein the air plenum is disposed directly behind the display window.

3. The passive solar heating system of claim 1, wherein the work of art is removable.

4. The passive solar heating system of claim 1, wherein the work of art is a sculpture.

5. The passive solar heating system of claim 1, wherein the work of art is constructed of aluminum.

6. The passive solar heating system of claim 5, wherein the aluminum is colored with metal dyes.

7. The passive solar heating system of claim 1, wherein the system has a shape selected from the group consisting of square, rectangular, triangle, and oval.

8. The passive solar heating system of claim 1, wherein the elements for the collection of solar heat are fern-shaped.

9. The passive solar heating system of claim 1, wherein the insulated framework is insulated with charcoal burnt cork insulation.

10. A passive solar heating system comprising:
    a heat exchange chamber having a display window and including:
       an insulated framework,
       a work of art contained inside the insulated framework and being configured to create a passive solar environment that creates a natural vacuum; and
    means for moving air through the heat exchange chamber.

11. The passive solar heating system of claim 10, wherein the air-moving means includes an air plenum operably connected to the heat exchange chamber.

12. The passive solar heating system of claim 11, wherein the air plenum includes:
    at least one intake vent,
    an exhaust vent, and
    at least one duct connecting the at least one intake vent to the heat exchange chamber, the at least one duct configured to conduct air flow from the at least one intake vent to the heat exchange chamber.

13. The passive solar heating system of claim 11, wherein the air plenum is disposed directly behind the display window.

14. The passive solar heating system of claim 10, wherein the air-moving means includes at least one fan.

15. The passive solar heating system of claim 10, wherein the work of art is removable.

16. The passive solar heating system of claim 10, wherein the work of art is a sculpture.

17. The passive solar heating system of claim 10, wherein the work of art is constructed of aluminum.

18. The passive solar heating system of claim 17, wherein the aluminum sculpture incorporates aluminum rivets, whereby air flow through the aluminum sculpture is uninterrupted.

19. A passive solar heating system, comprising:
    a heat exchange chamber having a display window and including:
       an insulated framework, and
       an aluminum sculpture contained inside the insulated framework; and
    an air plenum operably connected to the heat exchange chamber, the air plenum including:
       at least one intake vent,
       an exhaust vent, and
       at least one duct connecting the at least one intake vent to the heat exchange chamber, the at least one duct configured to conduct air flow from the at least one intake vent to the heat exchange chamber.

20. The passive solar heating system of claim 19, wherein the aluminum sculpture incorporates aluminum rivets, whereby air flow through the aluminum sculpture is uninterrupted.

* * * * *